United States Patent
Beiser et al.

(10) Patent No.: US 7,814,411 B2
(45) Date of Patent: Oct. 12, 2010

(54) METHOD AND APPARATUS FOR ADAPTING EXTERNAL CONTROLS TO A PORTAL DESIGN

(75) Inventors: Tsachi Beiser, Tel Aviv (IL); Yehuda Sinai, Raanana (IL); Ofer Feldman, Givat Shmuel (IL); Gilad Katz, Tel Aviv (IL)

(73) Assignee: SAP Portals Israel Ltd., Ra'Anana (IL)

( * ) Notice: Subject to any disclaimer, the term of this patent is extended or adjusted under 35 U.S.C. 154(b) by 1169 days.

(21) Appl. No.: 11/443,826

(22) Filed: May 31, 2006

(65) Prior Publication Data
US 2007/0283243 A1    Dec. 6, 2007

(51) Int. Cl.
*G06F 17/00* (2006.01)

(52) U.S. Cl. ...................... 715/236; 717/124

(58) Field of Classification Search .......... 715/236, 715/248; 717/124
See application file for complete search history.

(56) References Cited

U.S. PATENT DOCUMENTS

| | | | |
|---|---|---|---|
| 7,062,511 B1 * | 6/2006 | Poulsen | |
| 7,548,957 B1 * | 6/2009 | Wichmann et al. | 709/217 |
| 2005/0108647 A1 * | 5/2005 | Musson et al. | 715/744 |
| 2007/0283243 A1 * | 12/2007 | Beiser et al. | 715/513 |

OTHER PUBLICATIONS

"W3C CSS Validator results for base.css" Accessed Mar. 19, 2010 http://jigsaw.w3.org/css-validator/validator.*
"CSS Validation Service" Archived Jun. 9, 2004 http://jigsaw.w3.org/css-validator/.*
Source of "CSS Validation Service", "xhtml.properties.en" Ver. 1.5 Feb. 20, 2004 http://dev.w3.org/cvsweb/2002/css-validator/org/w3c/css/css/Attic/xhtml.properties.en?rev=1.5&content-type=text/x-cvsweb-markup.*

* cited by examiner

*Primary Examiner*—Adam M Queler
(74) *Attorney, Agent, or Firm*—Buckley, Maschoff & Talwalker LLC

(57) ABSTRACT

A method and apparatus for adapting the looks of an at least one control developed in an environment to a portal developed in a different environment. The apparatus and method enable the preview of a component comprising the control without deploying the changes to the portal, so other users can continue using the component in an uninterrupted manner until deployment.

12 Claims, 4 Drawing Sheets

METHOD AND APPARATUS FOR ADAPTING EXTERNAL CONTROLS TO A PORTAL DESIGN

BACKGROUND OF THE INVENTION

1. Field of the Invention

The present invention relates to a method and apparatus for providing a web portal designer with a possibility to adopt an external control to the look and feel of the web portal.

2. Discussion of the Related Art

The design and implementation of web portals involves analyzing and supplying content relevant to users of the portal, as well as designing and implementing the user-interface aspects, including the look-and-feel of the portal components. As for the look-and-feel aspects, a portal should preferably present a standardized look and feel, thus offering the user a feeling of consistency. Consistency may relate to ways of activating functionalities and consuming information or services from the portal, including locating and opening documents, accessing information, operating applications and services or the like. However, consistency also relates to the looks of elements in the system, including fonts, borders, color schemes, and additional factors. When portal elements employ uniform, matching or related looks, the portal looks more professional, harmonic and easy to use, rather than a mere collection of items. Some portals may offer users a multiplicity of available look-and-feel options, generally referred to as themes. Each theme preferably provides a uniform and harmonic look-and-feel, although the look-and feel may differ from look-and-feel associated with other themes. One or more themes may be made available to users based on their choices, privileges, role or any other factor.

As long as a portal component uses controls which were specifically developed for the portal, including controls such as buttons, labels, menus, images, check boxes, input fields, tables, collection of controls or others the uniform look-and-feel is usually inherent and requires no additional effort by the portal designer. However, uniformity is not guaranteed when portal components contains external controls i.e., controls originating from a different source, and not supplied with the portal development kit. Such controls can be third-party controls which are generally intended to be specifically adapted to users' needs, or the like. When using an external control, the control's look-and-feel which is usually different from the look-and-feel of the other portal's components, should be adapted to each theme offered by the portal, to provide a user with harmonic experience. However, the routine work of portal users should not be interrupted while a designer is adapting a control to the portal. Users should not be aware of changes in the control's looks, caused by the designer's work, and should be able to see only those versions of the control which the designer wishes to share.

There is therefore a need for a system and method that will provide a user interface designer, or a style designer with a way to adapt an external control to a look-and-feel of a portal theme. The system and method should enable the adaptation without affecting, disturbing, or confusing other users using the control until the user interface designer is ready to deploy the control's style and expose it to other users.

SUMMARY OF THE PRESENT INVENTION

It is an object of the present invention to provide a novel method for adapting the looks of an at least one control developed in an environment to a portal developed in a different environment, which overcomes the disadvantages of the prior art.

In accordance with the present invention, there is thus provided a method for displaying one or more portal components belonging to one or more portals, according to one or more user interface aspects prior to deploying the user interface aspect to the portal, the portal component containing one or more controls. The method comprising sending a request from a user's environment to the portal, the request comprising an indication for one or more files comprising one or more classes, each class comprising one or more attributes describing a user interface aspect; sending a response from the portal to the user's environment, the response comprising the indication of the at file; and rendering the component by the user's environment according to the class. Within the method, each control can be an external to the portal. Within the method, each file can be a CSS file. The method can further comprise the step of changing one or more classes comprised in the file. Within the method, the at least one file can be associated with one or more portal themes. The method can further comprise the step deploying the one or more files to the portal. The method can further comprise a presentation step for presenting to a user using a browser, the one or more portal components according to the user interface aspects. Within the method, the presentation step can comprise the steps of: sending a request from the browser to the portal to render the component; sending a request from the portal to a runtime engine to process the component; constructing a response to the request; within the response, adding an association to a second file, the second file related to the component; and sending the response to the browser. The method can further comprise the steps of sending a request to a back-end system, and receiving a response from the back-end system. The back-end system can be a database. The method can further comprise the steps of sending a request to a portal service, and receiving a response from the portal service.

Another aspect of the disclosed invention relates to an apparatus for displaying to a user using a browser one or more portal components containing one or more controls, the portal component belonging to one or more portals according to one or more user interface aspects, the user interface aspect related to a portal theme, the portal theme related one or more CSS files, the apparatus comprising: a runtime engine for adding to an association of one or more first files related to the portal theme a second association to one or more second files related to the portal component; and a rendering determination component for determining whether the component is native or external to the portal. The apparatus can further comprise an add-in component for a development environment, for changing the interface aspects. The development environment can be Visual Studio .NET.

Yet another aspect of the disclosed invention relates to a computer readable storage medium containing a set of instructions for a general purpose computer, the set of instructions comprising: sending a request from a browser to a portal to render one or more components; sending a request from the portal to a runtime engine to process the one or more components; constructing a response to the request; within the response, adding an association to one or more second files, the second files related to the component; and sending the response to the browser.

BRIEF DESCRIPTION OF THE DRAWINGS

The present invention will be understood and appreciated more fully from the following detailed description taken in conjunction with the drawings in which.

DETAILED DESCRIPTION OF THE PREFERRED EMBODIMENT

Definitions

Figure 1:
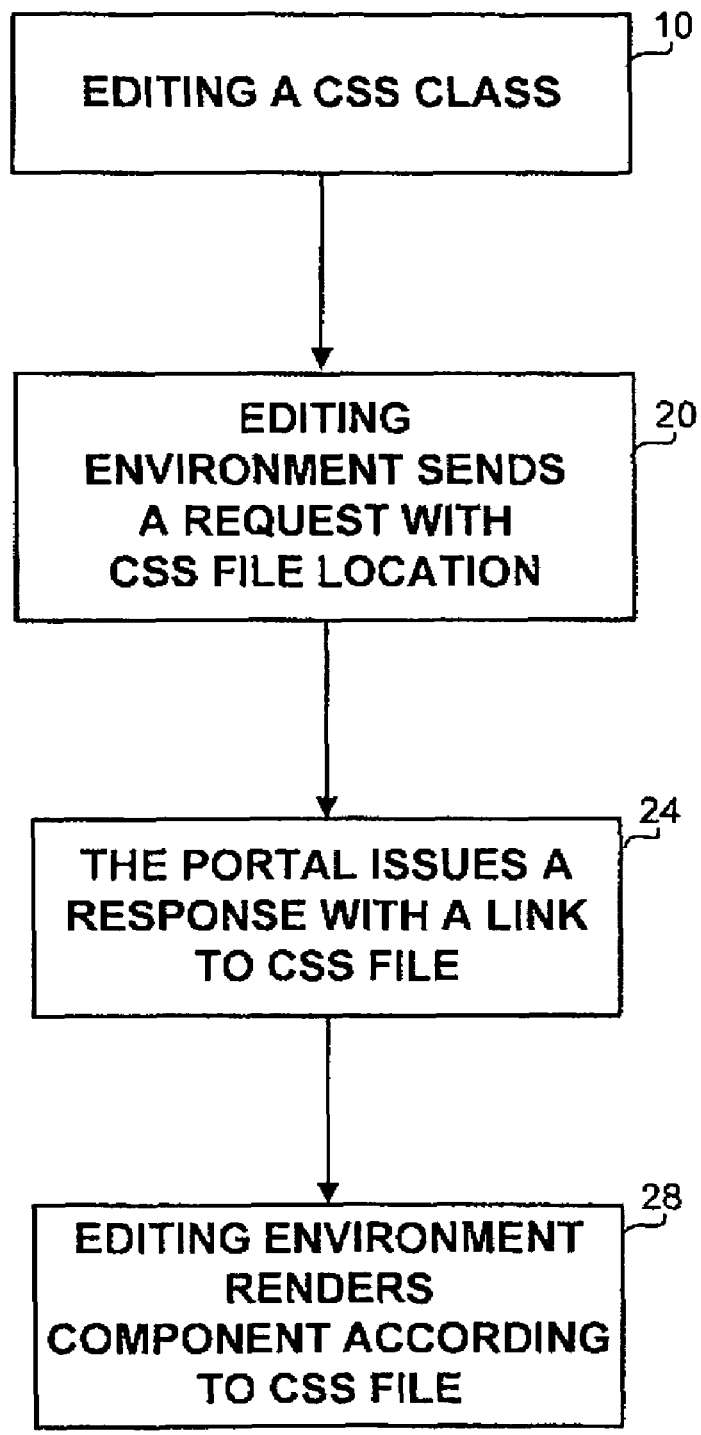
FIG. 1 is a flowchart of the main steps in the preview of a control, in accordance with a preferred embodiment of the disclosed invention.

Portal: a portal is a web site, which typically provides information and services, including distributed applications to a group of users, such as workers of an organization.

CSS class: a collection of attributes describing a user interface aspect, for example a font. The description includes relevant parameters of the aspect, such as font type, font size, text color, background color, or the like. The description below relates also to additional or alternative, currently known or used or that will become known or used in the future, names for attribute collections, whether the attribute collections are implemented as classes or otherwise.

CSS file: a collection of one or more CSS classes, placed in one file. Preferably, the extension of a CSS file is ".CSS". The description below relates also to additional or alternative, currently known or used or that will become known or used in the future, names for class collection, either implemented as a file or otherwise.

Portal theme: a collection of typical guidelines which characterize the looks of a portal, and furnish its contents with a uniform and harmonic look, including for example the usage of a family of colors, a specially designed border surrounding features, or the like. One or more themes can be designed for a portal, so that users can view the portal using one theme or the other according to their choice, according to their role definition, or the like. A portal theme is typically associated with one or more CSS files. The same portal, when viewed with a different theme will use a different set of CSS files.

Control: a control is the basic building block of a web page, providing certain functionality. A simple control can be a text label, a picture or the like. Other controls can involve receiving input from a user, including for example clicking on a radio button, typing text into a text box, choosing from a drop-down menu, or the like. Yet more complex controls can involve tables, applications such as spreadsheets, and others. Some well known controls include a list box, a label, a button, a radio button, an image, a combo box, a tab strip, a message area, an editable text, a loading animation, a file upload, a checkbox, a checkbox group, a tree, a link to a web page, a link to an action, a dropdown menu, a table, an input field. When designing a portal, a designer can use controls from various sources, including proprietary home-made controls, controls that come with the used development environment, such as Visual Studio .NET, or external controls including controls supplied by a third party. A control typically relates to a class describing its attributes, such as a CSS class.

Portal Component: a building block of a portal. A portal component is typically a container which contains one or more controls. Controls within a component can be independent or related.

ASP.NET Runtime Engine: ASP.NET Runtime Engine is a processing engine for portal content developed with ASP.NET technology, receiving an incoming request originated from a browser, routed to the ASP.NET engine typically by IIS and passing it through an internal pipeline to an end point where a code developed by a developer to process the request is executed.

PDK: portal development kit. An add-in to a development environment, such as visual studio Net. The PDK uses the framework of the development environment and provides tools for developing portal components. A set of controls is supplied with the PDK, to serve as building blocks for the portal components.

External Control: a control that was not supplied with the PDK. Usually external controls are third-party controls which are intended to be styled by a user to assume a specific look and feel.

The present invention overcomes the disadvantages of the prior art by providing a novel method and system for enabling the adaptation of external controls to a look-and-feel of a specific portal theme by a designer, while allowing other users of the portal to continue working without being aware to the adaptation process as performed by a designer. A designer selects a specific portal theme, and is presented with a list of all the CSS classes that are comprised within the CSS file associated with the theme. The designer then selects a portal component, and can replace or change any one or more of the CSS classes associated with the selected portal theme component controls. The designer can then have a preview of the effect of the change of the CSS classes on the controls that relate to the CSS classes. The preview is performed prior to deploying the changed CSS files to the portal, so other users viewing the control are not affected, because when previewing the component, the enhanced CSS file is used instead of the CSS file stored within the portal. In the disclosed invention, previewing the control involves sending a request to the portal and is not performed locally within the designer's computer, since in some cases only the portal may be able to provide the entire logic required for the presentation of a component.

Referring now to FIG. 1, showing a flowchart of the preview process. At step 10, a user, preferably a portal designer optionally changed one or more classes associated with a portal theme and referred to by an at least one control. The changing causes a local copy of the CSS file associated with the portal theme to be created on the designer's computer. At step 20, when the user wishes to see the control according to the enhanced style, the user's design environment issues a request to the portal to render the presented component. The request comprises an indication of the location of the CSS file on the designer's file system. The indication can be, for example a string containing the path of the CSS file which comprises the enhanced CSS class. When the portal receives the request with the style string from the designer's environment, the portal issues a response which renders the selected portal component to the request at step 24, which includes reference to enhanced CSS file but instead of rendering the component according to the theme definition as stored in the theme CSS files which are a part of the portal, the portal attaches to the response a link or another connection or indication related to the CSS file. When the designer's environment receives the response at step 28, it uses the link or the other indication to the CSS file, which is preferably local to the environment, to render the component according to the definitions in the local CSS file. This scheme prevents other users using the component from seeing changes to the style, since the request sent from their environments or browsers to the portal do not comprise a file location string, and moreover, the environments or browsers do not have access to the enhanced file. The designer's environment uses the contents of the local CSS file, in addition to the theme files which are stored within the portal, to render the component. For those classes enhanced by the local CSS file, the enhanced definitions are used, while other definitions are taken from the files stored within the portal. Thus only the component as presented by the designer's environment is affected, because the browsers of other users, or even the designer's browser (unlike the designer's development environment) requesting to view the component receive the rendering of the component enhanced according to the CSS file associated with the theme as stored within the portal. When the designer has finished enhancing one or more CSS classes comprised with one or more CSS files, he or she deploys the file to the portal. Then, a request issued from any browser to the portal, associated with that theme will result in a response containing a link to the commonly available CSS file, and the viewed components will assume the look as described in the updated file. This scheme takes effect when the designer designs components comprising controls other than those supplied with the PDK.

Figure 2:
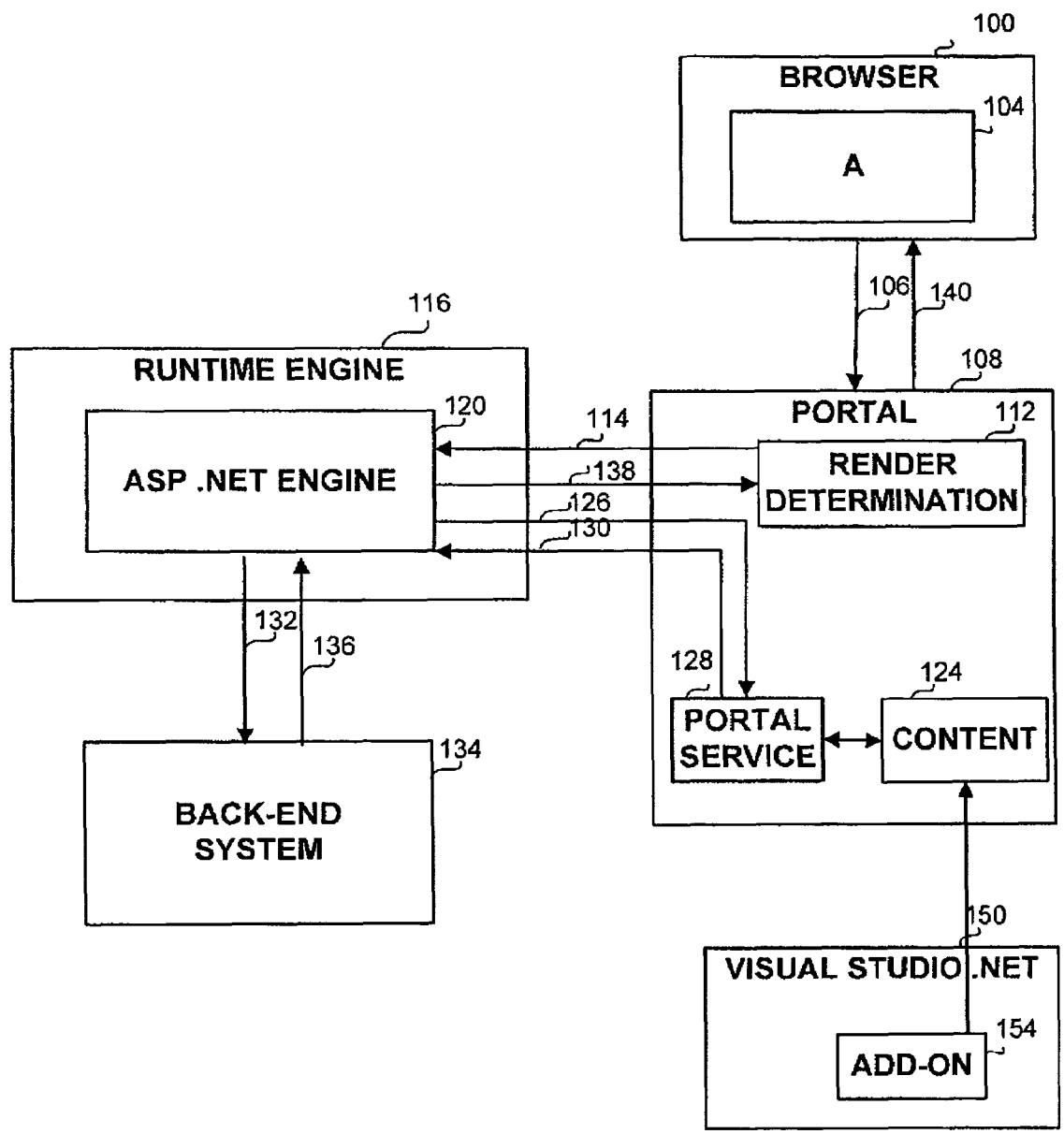
FIG. 2 is a general scheme of the components of a typical environment employing the disclosed invention.

Referring now to FIG. 2 showing a general scheme of the components of a typical environment employing the disclosed invention, and the flow of information between the components. The disclosed invention is particularly useful for users of a Java portal wishing to employ .Net components. Since a Java portal is generally unable to handle such components, a different mechanism is required. A browser 100 is showing pages from portal 108. Preferably, portal 108 is a Java portal. Browser 100 is showing a web page comprising a component A 104, wherein component A 104 further comprises control 105. Preferably, component A 104 is a .Net component and control 105 is external to the PDK. Once the designer designing component A 104 is satisfied with the looks of component A 104 under a specific portal theme, he deploys a CSS file, named for example A.CSS to style storage 125, style storage 125 storing extensions such as A.CSS to one or more portal themes. At runtime, browser 100 sends at step 106 a request to portal 108, to render component A 104. Since component A 104 comprises control 105 which is external to the PDK, a portal rendering determination component 112 is responsible for determining which CSS reference to be used when rendering component A 104. Determination component 112 sends at step 114 a request to runtime engine 116 to process component A 104. Runtime engine 116 is required to host ASP.NET engine 120 and to communicate with the portal. Runtime engine 116 supplies the ability to render portal components developed using the PDK for .NET. Runtime engine 116 renders the component as appearing in content storage 124. Content storage 124 stores the functionality, logic, location and possibly other information related to component A, and is accessible by the portal. Style storage 125 comprises the changed definitions for component A 104, for example an A.CSS file, and similarly a corresponding file for any other external component, as created by the designer using Visual Studio.Net 150 with add-in 154. Runtime engine 116 may send one or more requests for information at step 126 to portal service 128 and receive a response at step 130, for collecting data that is available within the portal, such as management or system landscape services. Runtime engine 116 may also send one or more requests for information at step 132 to one or more back-end system 134, such as a database, a web service, RFC or others. Once runtime engine 116 finished processing the request, it returns the rendered content, for example in html format at step 138 to portal 108, which adds to the response an association such as a link or a reference to the theme extension file (in the case of component A 104, the A.CSS file) that was stored in style storage 125 in portal 108, and returns the response. This applies only for those portal themes for which an extension had been stored. Browser 100 presents the response received from the portal and uses the overridden CSS classes in the added CSS file in order to apply the enhanced style. For those classes that have not been changed, the definitions available prior to the change take effect.

Figure 3:
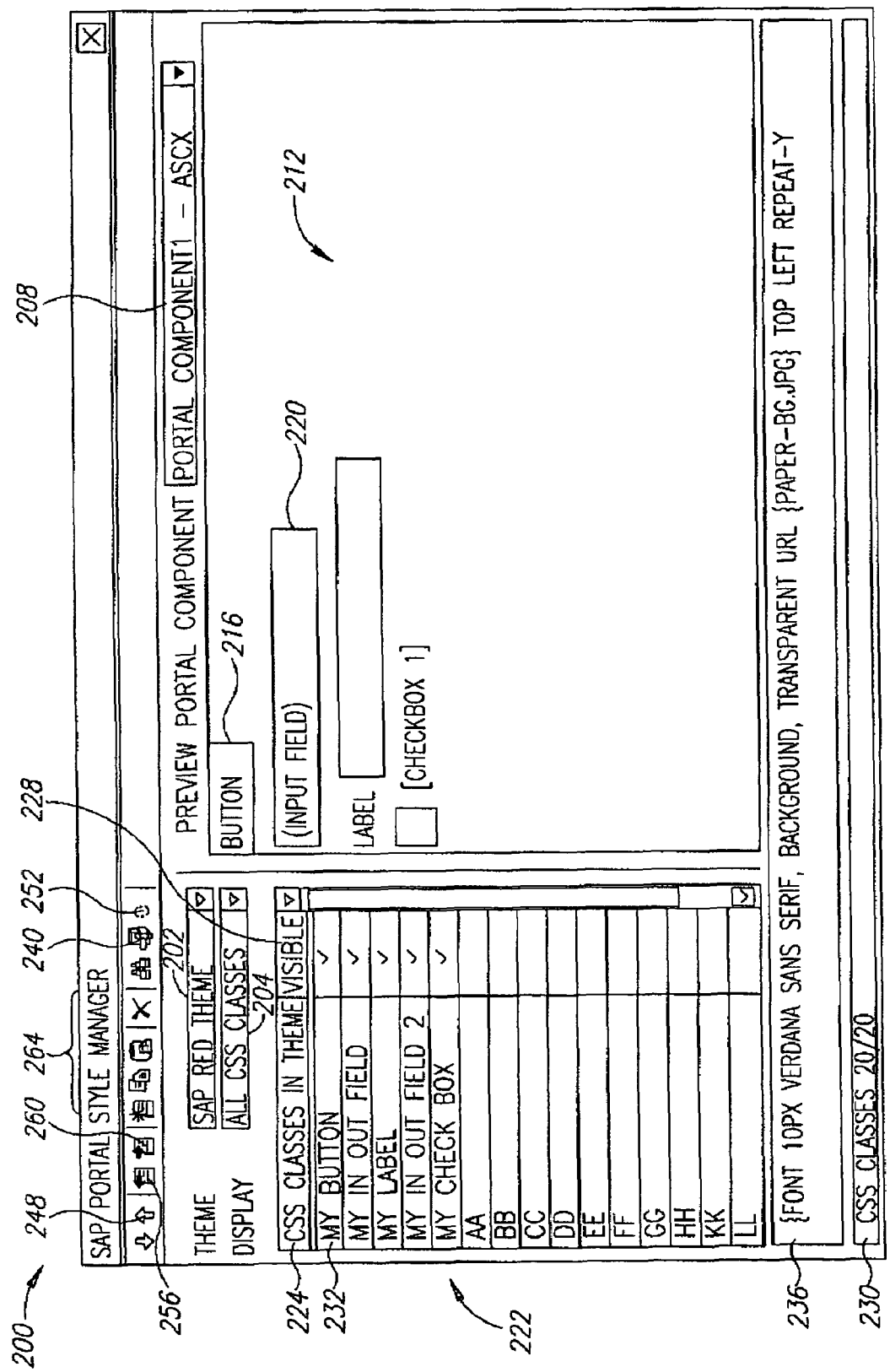
FIG. 3 is an illustration of a user interface used by a portal designer, in accordance with a preferred embodiment of the disclosed invention.

Referring now to FIG. 3, showing a possible user interface used by a portal designer for adapting external controls to the look and feel of a portal theme. The component implementing the user interface is an add-in to a development environment, such as Visual Studio .NET by Microsoft Corporation of Redmond, Wash., USA. The add-in enables a user (in this case a designer) to access the portal style designer, in addition to other abilities supplied by Visual Studio .NET. Designing a style with the user interface, generally referenced 200, starts by using drop down menu 202 to select a theme, and then choosing a display method for displaying the classes associated with the theme, using drop down menu 204. The user can choose to display all classes associated with the theme, only empty CSS classes, i.e., CSS classes for which no attribute is defined, or only the CSS classes that are referred to by the previewed component which is selected as will be described further below. After selecting a theme, the user chooses one component of the portal from drop down menu 208, and the chosen component is presented at pane 212. For example, the component shown in FIG. 3 is PortalComponent1, which comprises a button 216, an input field 220, a label and a checkbox. Pane 222 shows the various available CSS classes, including their name 224 and an indication 228 whether the class is visible in the portal component shown at pane 212. When one CSS class is selected, for example my Button 232, it is highlighted, and its definition is shown as a string in pane 236. Changing the class definition can be done either directly by editing the string in pane 236, or by pressing edit button 240, which opens the dialog discussed in association with FIG. 4 below, which enables the designer to change the various aspects of the style. Once the editing is done, for example when the user closes the style editing dialog, or when the user clicks the mouse outside pane 236, a preview of the component with the updated style is shown in pane 212. As detailed in association with FIG. 1 above, the preview operation involves addressing the portal rather than locally generating a preview, so that all the information and logic associated with the component are available. However, the preview operation does not involve deploying the component to the portal. Therefore, only the designer sees the preview of the component, and not other users using the component. The preview enables the designer to design and examine the looks of the component, without disturbing other users by allowing them to see the component before the design has been completed. In order to enable the preview, the designing environment attaches to the query string sent to the portal the local path of the CSS file, i.e. the path of the file as stored on the designer's computer. When the portal receives a request with the style query string, it adds to the response a reference to that file, which is used for styling the component. Requests to render the same component from other users, or even from the designer's browser, do not contain the path, so the control is rendered using the definitions as stored within the portal, and the responses are not affected by the designer's work until the styles are deployed to the portal. Preferably, all themes associated with a portal are loaded when the designer starts the environment. Button 248 is used to deploy the themes back to the portal, so that the styles will be available to all users. Button 256 enables the designer to export the CSS classes available with the current theme to a file. Button 260 enables the importing of classes from a file, the classes comprised in a different theme, or classes referenced in a portal component. Buttons 264 enables the standard activities of Copying or deleting the style selected from list 222, or pasting a previously copied style or creating a new style. Button 252 causes a refreshing of the view of the component according to the changed styles.

Figure 4:
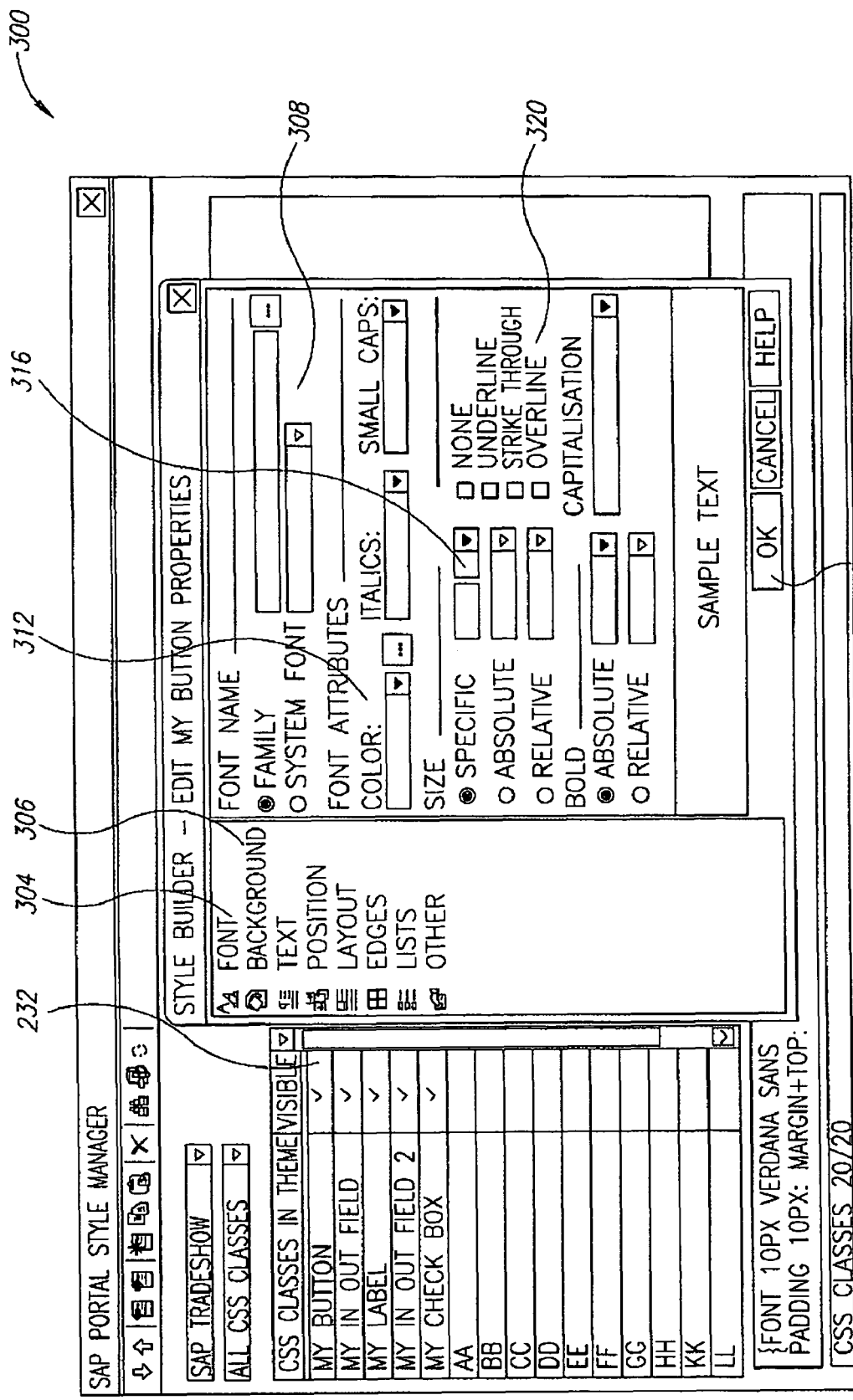
FIG. 4 is an illustration of a CSS class editing dialog, in accordance with a preferred embodiment of the present invention.

Referring now to FIG. 4, showing a possible implementation of a style editing dialog. The edited style is myButton 232. and the dialog, generally referenced as 300 provides the option to edit any aspect of the style including the font used within the button 304, background 306, and similarly the text, position, layout, edges, lists and additional currently available aspects, or aspects that will become known in the future. In FIG. 3, the active aspect is the font, for which the designer can choose font name 308, font attributes 312, font size 316, and effects 320. When the designer has finished editing the style, pressing OK button 324 updates the preview and shows the component in the enhanced style, without deploying the style and affecting other users. The editable features of each aspect, such as font, background, etc, are specific to the edited aspect type.

Referring now back to FIG. 2, showing the components of a typical environment using the disclosed invention. The components that have to be installed for using the disclosed invention, in addition to a standard portal environment are add-in component 154 for Visual Studio .NET, which enables the adaptation of external controls to a portal theme; runtime engine 116 which hosts the ASP.NET engine that renders content developed in ASP.NET; and render determination component 112, responsible for determining whether a specific component is native or external to the environment of the portal and adds a reference the theme extension CSS file. Add-in component 154 is preferably constructed as an addition to Visual Studio .NET, using tools within the Visual Studio .NET intended for creating an add-in. Component 154 implements methods associated with the portal, including for example developing content for the portal, deploying content, viewing portal components, creating archive files, debugging the developed content or the like. Among the actions performed by add-in component 154 are receiving portal themes, adding or removing classes to a theme, deploying a CSS file to a portal, receiving and setting class properties, or the like.

The disclosed invention provides a method and apparatus for adapting controls to the look and feel of a portal theme, even when the control is external to the environment running the portal. The method and apparatus provide a designer with a preview of portal components, for enabling them to view the looks of a control prior to deploying the theme extension to the portal and exposing it to other users.

It will be appreciated by persons skilled in the art that the present invention is not limited to what has been particularly shown and described hereinabove. Rather the scope of the present invention is defined only by the claims which follow.

What is claimed is:

1. A method for displaying an at least one portal component belonging to an at least one portal, according to an at least one user interface aspect prior to deploying the user interface aspect to the at least one portal, the portal component containing an at least one control, the method comprising the steps of:

sending a portal request from a user's environment to the at least one portal, wherein the user's environment is remote from the at least one portal, the request including an indication of a location of an at least one enhancement file comprising an at least one class, the at least one class comprising an at least one attribute describing a user interface aspect associated with the control, wherein the location of the at least one enhancement file is local to the user's environment;

processing the portal request at the portal to generate portal content, wherein said processing is performed in accordance with a standard file stored at the portal;

sending a response from the at least one portal to the user's environment, the response including the portal content along with the indication of the location of the at least one enhancement file;

based on said received indication of the location of the at least one enhancement file, accessing, by the user's environment, the enhancement file to determine the at least one class;

rendering the at least one component by the user's environment according to the determined at least one class; and presenting the portal content at the user's environment, wherein the at least one component is displayed in accordance with said rendering.

2. The method of claim 1 wherein the at least one control is external to the portal.

3. The method of claim 1 wherein the at least one file is a CSS file.

4. The method of claim 1 further comprising the step of changing an at least one class comprised in the at least one file.

5. The method of claim 1 wherein the at least one file is associated with an at least one portal theme.

6. The method of claim 1 further comprising the step of deploying the at least one file to the portal.

7. The method of claim 1 wherein said presenting further comprises a presentation step for presenting to a user using a browser, the at least one portal component according to the at least one user interface aspect.

8. The method of claim 7 wherein the presentation step comprises the steps of:

sending a request from the browser to the portal to render the at least one component;

sending a request from the portal to a runtime engine to process the at least one component;

constructing a response to the request;

within the response, adding an association to an at least one second file, the second file related to the at least one component; and sending the response to the browser.

9. The method of claim 8 further comprising the steps of:

sending a request to a back-end system; and receiving a response from the back-end system.

10. The method of claim 9 wherein the back-end system is a database.

11. The method of claim 8 further comprising the steps of:

sending a request to a portal service; and receiving a response from the portal service.

12. A computer readable storage medium containing a set of instructions for a general purpose computer, wherein execution of the instructions by the computer results in:

sending a portal request from a user's environment to the at least one portal, wherein the user's environment is remote from the at least one portal, the request including an indication of a location of an at least one enhancement file comprising an at least one class, the at least one class comprising an at least one attribute describing a user interface aspect associated with the control, wherein the location of the at least one enhancement file is local to the user's environment;

processing the portal request at the portal to generate portal content, wherein said processing is performed in accordance with a standard file stored at the portal;

sending a response from the at least one portal to the user's environment, the response including the portal content along with the indication of the location of the at least one enhancement file;

based on said received indication of the location of the at least one enhancement file, accessing, by the user's environment, the enhancement file to determine the at least one class;

rendering the at least one component by the user's environment according to the determined at least one class; and presenting the portal content at the user's environment, wherein the at least one component is displayed in accordance with said rendering.

* * * * *